United States Patent
Kwon et al.

(10) Patent No.: US 11,263,018 B2
(45) Date of Patent: Mar. 1, 2022

(54) VECTOR PROCESSOR AND CONTROL METHOD THEREFOR

(71) Applicant: SAMSUNG ELECTRONICS CO., LTD., Suwon-si (KR)

(72) Inventors: Ki-seok Kwon, Seoul (KR); Jae-un Park, Seoul (KR); Dong-kwan Suh, Yongin-si (KR); Kang-jin Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/462,086

(22) PCT Filed: Oct. 23, 2017

(86) PCT No.: PCT/KR2017/011725
§ 371 (c)(1),
(2) Date: May 17, 2019

(87) PCT Pub. No.: WO2018/101607
PCT Pub. Date: Jun. 7, 2018

(65) Prior Publication Data
US 2020/0272478 A1      Aug. 27, 2020

(30) Foreign Application Priority Data
Dec. 2, 2016    (KR) .................. 10-2016-0163399

(51) Int. Cl.
*G06F 9/38*    (2018.01)
*G06F 9/30*    (2018.01)

(52) U.S. Cl.
CPC ........ *G06F 9/3887* (2013.01); *G06F 9/30032* (2013.01); *G06F 9/30036* (2013.01); *G06F 9/30105* (2013.01)

(58) Field of Classification Search
CPC ..................................................... G06F 9/3887
See application file for complete search history.

(56) References Cited

U.S. PATENT DOCUMENTS 6,115,812 A  *  9/2000  Abdallah ............ G06F 9/30014
                                                        708/520
7,467,288 B2    12/2008  Glossner, III et al.
(Continued)

OTHER PUBLICATIONS

International Search Report (PCT/ISA/210), issued by International Searching Authority in International Application No. PCT/KR2017/011725, dated Feb. 2, 2018.
(Continued)

*Primary Examiner* — Michael J Metzger
(74) *Attorney, Agent, or Firm* — Sughrue Mion, PLLC

(57) ABSTRACT

A vector processor is disclosed. The vector processor includes a plurality of register files provided to each of a plurality of single instruction multiple data (SIMD) lanes, storing each of a plurality of pieces of data, and respectively outputting input data to be used in a current cycle among the plurality of pieces of data, a shuffle unit for receiving a plurality of pieces of input data outputted from the plurality of register files, and performing shuffling such that the received plurality of pieces of input data respectively correspond to the plurality of SIMD lanes and outputting the same; and a command execution unit for performing a parallel operation by receiving input data outputted from the shuffle unit.

13 Claims, 12 Drawing Sheets

(56) References Cited

U.S. PATENT DOCUMENTS

| | | |
|---|---|---|
| 8,190,854 B2 | 5/2012 | Codrescu et al. |
| 8,984,499 B2 | 3/2015 | Uliel et al. |
| 9,141,386 B2 | 9/2015 | Wiedemeier et al. |
| 9,189,237 B2 | 11/2015 | Chen et al. |
| 2006/0227966 A1 | 10/2006 | Knowles |
| 2008/0065863 A1* | 3/2008 | Eichenberger ...... G06F 9/30032 712/224 |
| 2009/0172358 A1* | 7/2009 | Sperber ............... G06F 9/30109 712/208 |
| 2013/0275718 A1* | 10/2013 | Ueda ................... G06F 9/30032 712/204 |
| 2013/0318328 A1 | 11/2013 | Ould-Ahmed-Vall et al. |
| 2013/0339649 A1 | 12/2013 | Hsu et al. |
| 2014/0181477 A1 | 6/2014 | Vadiya et al. |
| 2015/0154008 A1 | 6/2015 | Uliel et al. |
| 2015/0356054 A1 | 12/2015 | Barak et al. |
| 2016/0188532 A1 | 6/2016 | Ould-Ahmed-Vall et al. |
| 2016/0202983 A1* | 7/2016 | Lin ....................... G06F 9/3802 712/225 |
| 2017/0286112 A1* | 10/2017 | Espasa ................ G06F 9/30018 |

OTHER PUBLICATIONS

Written Opinion (PCT/ISA/237) issued by the International Searching Authority in International Application No. PCT/KR2017/011725, dated Feb. 2, 2018.

* cited by examiner

| Time | 4-way SIMD CORE (Lane 0, 1, 2, 3) | | | |
|---|---|---|---|---|
| T0 | out(0,0) = w0 * in(0,0) | out(0,1) = w0 * in(0,1) | out(0,2) = w0 * in(0,2) | out(0,3) = w0 * in(0,3) |
| T1 | out(0,0) += w1 * in(0,1) | out(0,1) += w1 * in(0,2) | out(0,2) += w1 * in(0,3) | out(0,3) += w1 * in(0,4) |
| T2 | out(0,0) += w2 * in(0,2) | out(0,1) += w2 * in(0,3) | out(0,2) += w2 * in(0,4) | out(0,3) += w2 * in(0,5) |
| T3 | out(0,0) += w3 * in(1,0) | out(0,1) += w3 * in(1,1) | out(0,2) += w3 * in(1,2) | out(0,3) += w3 * in(1,3) |
| T4 | out(0,0) += w4 * in(1,1) | out(0,1) += w4 * in(1,2) | out(0,2) += w4 * in(1,3) | out(0,3) += w4 * in(1,4) |
| T5 | out(0,0) += w5 * in(1,2) | out(0,1) += w5 * in(1,3) | out(0,2) += w5 * in(1,4) | out(0,3) += w5 * in(1,5) |
| T6 | out(0,0) += w6 * in(2,0) | out(0,1) += w6 * in(2,1) | out(0,2) += w6 * in(2,2) | out(0,3) += w6 * in(2,3) |
| T7 | out(0,0) += w7 * in(2,1) | out(0,1) += w7 * in(2,2) | out(0,2) += w7 * in(2,3) | out(0,3) += w7 * in(2,4) |
| T8 | out(0,0) += w8 * in(2,2) | out(0,1) += w8 * in(2,3) | out(0,2) += w8 * in(2,4) | out(0,3) += w8 * in(2,5) |
| T9 | out(0,4) = w0 * in(0,4) | out(0,5) = w0 * in(0,5) | out(0,6) = w0 * in(0,6) | out(0,7) = w0 * in(0,7) |
| T10 | out(0,4) += w1 * in(0,5) | out(0,5) += w1 * in(0,6) | out(0,6) += w1 * in(0,7) | out(0,7) += w1 * in(0,8) |
| T11 | out(0,4) += w2 * in(0,6) | out(0,5) += w2 * in(0,7) | out(0,6) += w2 * in(0,8) | out(0,7) += w2 * in(0,9) |
| T12 | out(0,4) += w3 * in(1,4) | out(0,5) += w3 * in(1,5) | out(0,6) += w3 * in(1,6) | out(0,7) += w3 * in(1,7) |
| T13 | out(0,4) += w4 * in(1,5) | out(0,5) += w4 * in(1,6) | out(0,6) += w4 * in(1,7) | out(0,7) += w4 * in(1,8) |
| ... | | | | |

FIG. 7

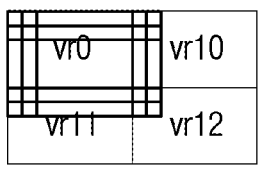
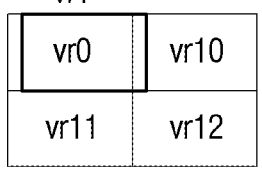
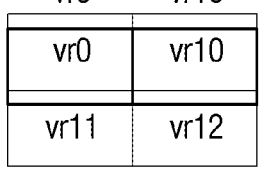

|  | RELATED ART | PRESENT DISCLOSURE |
|---|---|---|
| Prep. | load $vr0   # main image<br>load $vr10  # right<br>load $vr11  # bottom<br>load $vr12  # bottom right | load $vr0   # main image<br>load $vr10  # right<br>load $vr11  # bottom<br>load $vr12  # bottom right |
| 1st row | load $sr9   # filter weight<br>mul $vr15, $vr0, $sr9<br>load $sr9<br>hcat $vr1, $vr0, $vr10, 1<br>mac $vr15, $vr1, $sr9<br>load $sr9<br>hcat $vr2, $vr0, $vr10, 2<br>mac $vr15, $vr2, $sr9 | sf_set2d $vr11, $vr10,<br>$vr12, 3, 3, 1, 1<br>load $sr9   # filter weight<br>sf_mul $vr15, $vr0, $sr9<br>load $sr9<br>sf_mac $vr15, $vr0, $sr9<br>load $sr9<br>sf_mac $vr15, $vr0, $sr9 |
| 2nd row | vcat $vr13, $vr10, $vr12, 1<br>load $sr9<br>vcat $vr3, $vr0, $vr11, 1<br>mac $vr15, $vr3, $sr9<br>load $sr9<br>hcat $vr4, $vr3, $vr13, 1<br>mac $vr15, $vr4, $sr9<br>load $sr9<br>hcat $vr5, $vr3, $vr13, 2<br>mac $vr15, $vr5, $sr9 | load $sr9<br>sf_mac $vr15, $vr0, $sr9<br>load $sr9<br>sf_mac $vr15, $vr0, $sr9<br>load $sr9<br>sf_mac $vr15, $vr0, $sr9 |
| 3rd row | vcat $vr13, $vr10, $vr12, 2<br>load $sr9<br>vcat $vr6, $vr0, $vr11, 2<br>mac $vr15, $vr6, $sr9<br>load $sr9<br>hcat $vr7, $vr6, $vr13, 1<br>mac $vr15, $vr7, $sr9<br>load $sr9<br>hcat $vr8, $vr6, $vr13, 1<br>mac $vr15, $vr8, $sr9 | load $sr9<br>sf_mac $vr15, $vr0, $sr9<br>load $sr9<br>sf_mac $vr15, $vr0, $sr9<br>load $sr9<br>sf_mac $vr15, $vr0, $sr9 |

VECTOR PROCESSOR AND CONTROL METHOD THEREFOR

TECHNICAL FIELD

This disclosure relates to a vector processor and a control method therefor, and, more specifically, to a vector processor for simultaneously processing several values with one instruction and a control method therefor.

BACKGROUND ART

Single Instruction Multiple Data (SIMD) is one category of parallel operations for processing several data through one instruction. Specifically, the SIMD is a method in which a plurality of execution units apply the same or similar operations to a plurality of data and simultaneously process the operations.

In the related art, a plurality of data are stored in a vector register file, and data to be used in a current cycle, among the plurality of data, is shuffled and stored in the vector register file again. In other words, the vector register file is additionally stored with separate data which shuffles a plurality of data in addition to a plurality of data, and the step of deleting after use is repeated. Accordingly, there is a problem in that power consumption is huge.

Further, when performing shuffling of a plurality of data, there is a difference in the shuffling method for each cycle, so a separate instruction for performing shuffling for each cycle is required. As a result, there is a problem that a program code is lengthened.

DISCLOSURE

Technical Problem

The disclosure provides a vector processor for improving the processing speed of redundant operations and a control method therefor.

Technical Solution

According to an embodiment of the disclosure, a vector process includes a plurality of register files, wherein each of the plurality of register files provided to each of single instruction multiple data (SIMD) lanes, storing a plurality of data, and outputting input data to be used in a current cycle among the plurality of data, a shuffle unit for receiving a plurality of input data outputted from the plurality of register files, and performing shuffling such that the received plurality of input data respectively correspond to the plurality of SIMD lanes and outputting the same, and an execution unit for receiving input data outputted from the shuffle unit and performing a parallel operation on the input data.

The shuffle unit may include a plurality of multiplexers provided in each of the plurality of SIMD lanes, and each of the plurality of multiplexers may receive a plurality of input data outputted from the plurality of register files, and output one input data corresponding to a lane provided with the corresponding multiplexer among the received plurality of input data.

The vector processor may further include a shuffle control unit to control the plurality of register files and the shuffle unit by cycles based on an input instruction.

The shuffle control unit may transmit a reference register address of each of the plurality of SIMD lanes to each of the plurality of register files, and the reference register address may be an address of input data which is used in a current cycle among the plurality of data stored in each register file.

The shuffle control unit may transmit shuffle information on the plurality of input data to the shuffle unit, and the shuffle information may be information on input data to be outputted from each of the plurality of SIMD lanes.

The shuffle control unit may include an address multiplexer to provide reference register address for input data to be used in a current cycle to each of the plurality of register files, and a control unit to control the address multiplexer.

The shuffle control unit may further include at least one address register to store reference register address of each of the plurality of SIMD lanes, and the control unit may control the address multiplexer to provide one of the plurality of reference register addresses provided from the instruction decode unit and the at least one address register to a corresponding register file.

The input instruction may include at least one of a type of operations to be processed by the execution unit, an operation method, and information on an increment in a horizontal direction and an increment in a vertical direction.

The vector processor may further include a scalar register file, and the execution unit may perform a parallel operation of input data outputted from the shuffle unit using scalar data outputted from the scalar register file.

According to an embodiment of the disclosure, a control method of a vector processor includes storing a plurality of data to each of a plurality of register files provided to each of SIMD lanes, and outputting input data to be used in a current cycle among the plurality of data, receiving a plurality of input data outputted from the plurality of register files, and performing shuffling such that the received plurality of input data respectively correspond to the plurality of SIMD lanes and outputting the same, and receiving input data outputted from the shuffle unit and performing a parallel operation on the input data.

The outputting by performing shuffling may include receiving a plurality of input data outputted from the plurality of register files by each of the plurality of multiplexers provided in each of the plurality of SIMDs in the shuffle unit, and outputting one input data corresponding to a lane provided with the corresponding multiplexer among the received plurality of input data.

The control method may further include controlling the plurality of register files and the shuffle unit by cycles based on an input instruction.

The controlling may include transmitting a reference register address of each of the plurality of SIMD lanes to each of the plurality of register files, and the reference register address may be an address of input data which is used in a current cycle among the plurality of data stored in each register file.

The controlling may include transmitting shuffle information on the plurality of input data to the shuffle unit, and the shuffle information may be information on input data to be outputted from each of the plurality of SIMD lanes.

The controlling may include controlling an address multiplexer to provide reference register address for input data to be used in a current cycle to each of the plurality of register files.

The controlling may include storing reference register address of each of the plurality of SIMD lanes, and controlling the address multiplexer to provide one of the plurality of reference register addresses provided from the instruction decode unit and the at least one address register to a corresponding register file.

The input instruction may include at least one of a type of operations to be processed by the execution unit, an operation method, and information on an increment in a horizontal direction and an increment in a vertical direction.

The performing a parallel operation may include performing a parallel operation of input data outputted from the shuffle unit using scalar data outputted from the scalar register file.

According to an embodiment of the disclosure, a recordable medium storing a program to execute an operation method of a vector processor, in which the operation method includes storing a plurality of data to each of a plurality of register files provided to each of SIMD lanes, and respectively outputting input data to be used in a current cycle among the plurality of data, receiving a plurality of input data outputted from the plurality of register files by the shuffle unit, and performing shuffling such that the received plurality of input data respectively correspond to the plurality of SIMD lanes and outputting the same, and executing a parallel operation by receiving input data outputted from the shuffle unit.

Advantageous Effects

As set forth above, according to the diverse embodiments of the disclosure, the vector processor may improve processing speed and energy efficiency by performing shuffling of input data, and then performing an operation without re-storing.

DESCRIPTION OF DRAWINGS

FIG. 3B is a view to describe an operation in a case where a filter is applied according to an embodiment of the disclosure.

FIG. 3C is a view to describe an operation in a case where a filter is applied according to an embodiment of the disclosure.

FIG. 7 is a view to describe simplification of a program code according to an embodiment of the disclosure.

BEST MODE

Hereinbelow, diverse embodiments of the disclosure will be described in a greater detail with reference to the attached drawings.

Figure 1:
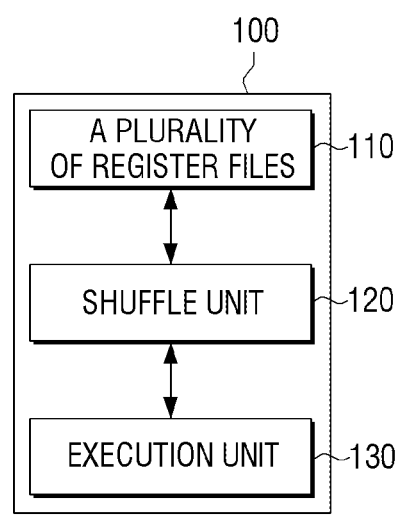
FIG. 1 is a block diagram illustrating a configuration of a vector processor according to an embodiment of the disclosure.

FIG. 1 is a block diagram illustrating a configuration of a vector processor 100 according to an embodiment of the disclosure.

As illustrated in FIG. 1, the vector processor 100 includes a plurality of register files 110, a shuffle unit 120, and an execution unit 130.

The vector processor 100 means a processor having instructions for processing a plurality of data called a vector. For example, the vector processor 100 may process single instruction multiple data (SIMD) instruction for vector processing to process multiple data. Here, the SIMD means a method for simultaneously computing several values with one instruction.

Each of the plurality of register files 110 may be provided in each of a plurality of the SIMD lanes. In other words, each SIMD lane may have one register file. Here, the plurality of SIMD lanes may correspond to a parallel processing unit. In other words, the vector processor 100 may perform parallel processing for as many as the number of the plurality of the SIMD lanes, to the maximum.

The plurality of register files 110 may be composed of a plurality of scalar register files rather than a vector register file. The vector register file may have an architecture in which a plurality of data are stored in one address, and the scalar register file may have an architecture in which one data is stored in one address. In other words, the register address for outputting the data stored in the plurality of register files 110 may include the SIMD lane information and the address to which data of the scalar register file corresponding to the SIMD lane is to be output.

Each of the plurality of register files 110 may store a plurality of data, and output input data used in a current cycle among the plurality of data. For example, one register file may store two data, and output input data used in a current cycle. The remaining register files may store two data in the same manner, and output input data used in a current cycle. In other words, during one cycle, the number of data which is outputted from the plurality of register files 110 may be equal to the number of the plurality of register files 110.

The embodiment of the disclosure is not limited thereto, and when the parallel processing unit is smaller than the number of the plurality of register files 110, the number of data outputted from the plurality of register files 110 during one cycle may be smaller than the number of the plurality of register files 110.

The shuffle unit 120 may be connected to the plurality of register files 110, and receive a plurality of input data which is outputted from the plurality of register files. In other words, the shuffle unit 120 may receive one input data for each SIMD lane.

The shuffle unit 120 may perform shuffling and output a plurality of received input data to correspond to each of the plurality of SIMD lanes. For example, the shuffle unit 120 may receive data a, data b, data c, and data d from the first register file, the second register file, the third register file, and the fourth register file, respectively. Here, each of the first register file, the second register file, the third register file, and the fourth register file may be provided in the first SIMD lane, the second SIMD lane, the third SIMD lane, and the fourth SIMD lane. The shuffle unit 120 may perform shuffling and output the received data a, data b, data c, and data d to be processed in the second SIMD lane, the third SIMD lane, the fourth SIMD lane, and the first SIMD lane, respectively. The shuffling method may be predetermined or may be input by a user according to types of operations.

The execution unit 130 may receive input data outputted from the shuffle unit 120 and perform parallel operations. The execution unit 130 may perform parallel processing for a plurality of input data per cycle.

The execution unit 130 may perform four fundamental arithmetic operations, logical operations, and the like. However, the embodiment of the disclosure is not limited thereto, and the execution unit 130 may perform any other operations.

The execution unit 130 may include a plurality of execution units provided in each of the plurality of SIMD lanes. Alternatively, the execution unit 130 may be implemented to simultaneously process a plurality of operations as one hardware.

Figure 2:
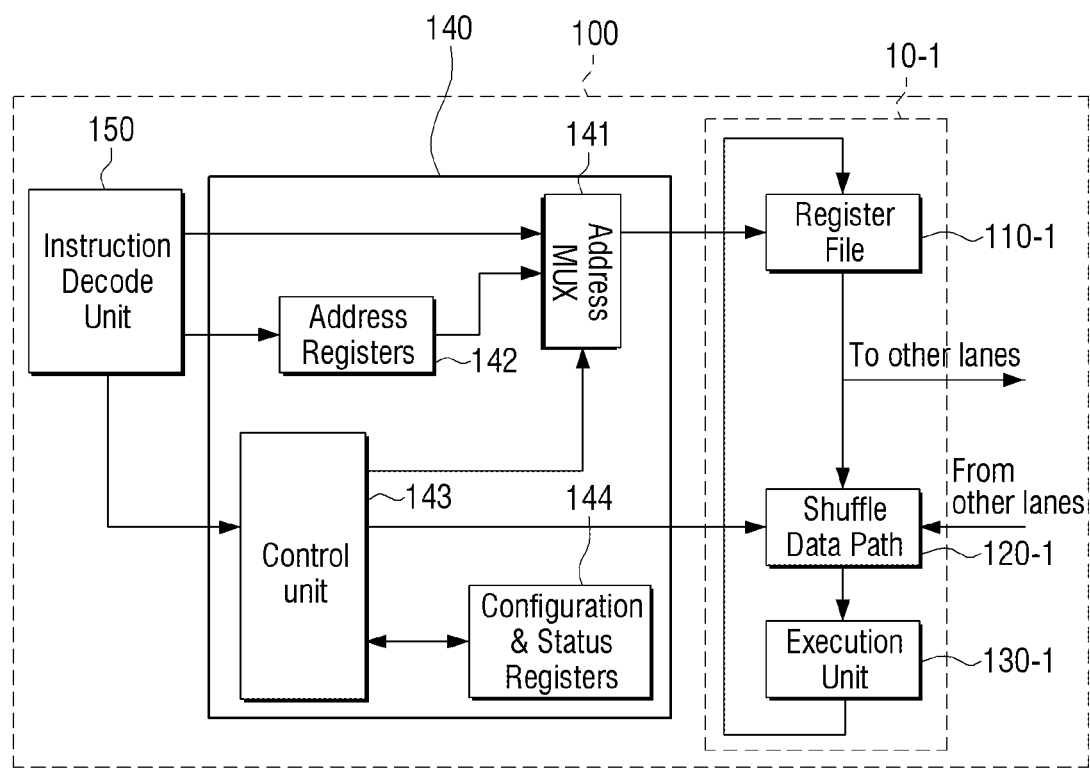
FIG. 2 is a block diagram specifically illustrating a configuration of the vector processor of FIG. 1 according to an embodiment of the disclosure.

FIG. 2 is a block diagram specifically illustrating a configuration of the vector processor 100 of FIG. 1 according to an embodiment of the disclosure.

As shown in FIG. 2, the vector processor 100 may include a first SIMD lane 10-1 among a plurality of the SIMD lanes, a shuffle control unit 140, and an instruction decode unit 150. In FIG. 2, only the first SIMD lane 10-1 among a plurality of the SIMD lanes is illustrated for convenience of description. The description of the configuration of FIG. 2 which overlaps the configuration of FIG. 1 will be omitted.

The first SIMD lane 10-1 may include a first register file 110-1, a first shuffle data path 120-1, and an execution unit 130-1. The first shuffle data path 120-1 may be a configuration of the shuffle unit 120. That is, the shuffle unit 120 may include a plurality of shuffle data paths, and each shuffle data path may be provided in each SIMD lane.

The shuffle unit 120 may include a plurality of multiplexers provided in each of the plurality of SIMD lanes. That is, the first shuffle data path 120-1 may be implemented as a multiplexer. Each of the plurality of multiplexers may receive a plurality of input data outputted from the plurality of register files 110 and output one input data corresponding to a lane provided with the multiplexer, among the received plurality of input data.

For example, the first shuffle data path 120-1 may be implemented with a first multiplexer, the first multiplexer may receive not only input data outputted from the first register file 110-1, but also input data outputted from the remaining register files provided in other SIMD lanes. That is, the number of input ports of the multiplexer may be the same as the number of the plurality of SIMD lanes.

Also, a second shuffle data path (not shown) provided in a second SIMD lane (not shown) may be implemented with a second multiplexer, and the second multiplexer may receive not only the input data which is outputted from the second register file (not shown), but also the input data outputted from the remaining register files provided in other SIMD lanes.

That is, each of the plurality of multiplexers may receive a plurality of input data from the plurality of register files 110. In addition, each register file 110 may provide input data to not only a shuffle data path provided in a corresponding SIMD lane but also to a shuffle data path provided in another SIMD lane.

The first shuffle data path 120-1 may provide input data outputted from the first register file 110-1 to an execution unit provided in a SIMD lane other than the first SIMD lane 10-1. Also, the first shuffle data path 120-1 may provide one of the plurality of input data outputted from the register file other than the first register file 110-1 to the first execution unit 130-1.

However, the embodiment is not limited thereto, and the shuffle data path 120-1 may output a plurality of received input data without performing shuffling. For example, the first shuffle data path 120-1 may provide input data outputted from the first register file 110-1 to the first execution unit 130-1. Alternatively, the input data outputted from the first register file 110-1 may be provided directly to the first execution unit 130-1 without passing through the first shuffle data path 120-1.

The shuffle control unit 140 may control the plurality of register files 110 and the shuffle unit 120 by each cycle based on input instructions. Alternatively, the shuffle control unit 140 may control the plurality of register files 110 and the shuffle unit 120 by each cycle based on the input instructions and the current state. At this time, the shuffle control unit 140 may store the current state. Further, the shuffle control unit 140 may update the current state whenever one cycle elapses.

The shuffle control unit 140 may transfer the reference register addresses of each of the plurality of SIMD lanes to each of the plurality of register files 110. Here, the reference register address may be an address of input data used in the current cycle among a plurality of data stored in each register file.

For example, the first register file 110-1 may store the data a at the register address R0 and the data b at the register address R1. In this state, when the shuffle control unit 140 transmits the reference register address R1 of the first SIMD lane 10-1 to the first register file 110-1, the first register file 110-1 may output the data b of the register address R1. The shuffle control unit 140 may transmit the reference register address corresponding to the remaining register files.

The shuffle control unit 140 may transmit shuffle information for a plurality of input data to the shuffle unit 120. That is, the shuffle control unit 140 may transmit the shuffle information for a plurality of input data to the plurality of shuffle data paths provided in the shuffle unit 120. Here, the shuffle information may be information on the input data to be output in each of the plurality of SIMD lanes.

For example, the shuffle control unit 140 may provide, to the first multiplexer, information on the input port to which the input data to be outputted from the current cycle is input, among the plurality of input data input to the plurality of input ports of the first multiplexer. The shuffle control unit 140 may also provide information corresponding to each of the remaining multiplexers.

The shuffle control unit 140 may generate shuffle information for a plurality of input data based on at least one of an input instruction and a current state. As described above, the plurality of register files 110 and the shuffle unit 120 may operate according to the control of the shuffle control unit 140. Hereinafter, the configuration of the shuffle control unit 140 will be described in further detail.

The shuffle control unit 140 may include an address multiplexer 141, an address register 142, a control unit 143, and a configuration register 144.

The address multiplexer 141 may provide a reference register address for the input data to be used in the current cycle to each of the plurality of register files 110. Although FIG. 2 shows that there is one address multiplexer 141, but the embodiment is not limited thereto. For example, the address multiplexer 141 may be implemented to be plural to correspond to each of the plurality of register files 110.

At least one address register 142 may store a reference register address of each of a plurality of SIMD lanes. At least one address register 142 may receive and store a reference register address from the instruction decode unit 150.

The control unit 143 may control the address multiplexer 141 and the shuffle data path 120-1. The method of controlling the shuffle data path 120-1 has been described and will not be further described.

The control unit 143 may control the address multiplexer 141 to provide one of a plurality of reference register addresses provided from the instruction decode unit 150 and the at least one address register 142 to the corresponding register file.

The configuration register 144 may store the information included in the input instruction. Also, the configuration register 144 may store the current state. For example, the configuration register 144 may include a counter for storing the current state.

The control unit 143 may control other units based on the information stored in the configuration register 144. Here, the input instruction may include at least one of the type of operation to be processed by the execution unit 130, the operation method, and information on an increment in the horizontal and vertical directions.

In addition, the vector processor 100 may further include an instruction memory (not shown), an instruction fetch unit (not shown), the instruction decode unit 150, a scalar register file (not shown), or the like.

The instruction memory may store instructions. The instruction fetch unit may read instructions to be used in the current cycle from the instruction memory based on the input instruction. The instruction decode unit 150 may determine the type of instruction, the address of the input data of the instruction, and the like by decoding the fetched instructions.

The scalar register file, provided separately from the plurality of register files, is a register file for storing scalar data. The plurality of register files are register files for storing vector data.

The execution unit 130 may perform parallel operation of the plurality of input data outputted from the shuffle unit 120 using the scalar data outputted from the scalar register file.

That is, the scalar data outputted from the scalar register file may be transmitted to all of the plurality of execution units included in the execution unit 130. The execution unit may operate scalar data and input data input to each execution unit. That is, a plurality of execution units may perform parallel operation using one scalar data.

As described above, the execution unit 130 directly receives the input data from the shuffle unit 120, not from the plurality of register files 110, and thus may improve the processing speed and energy efficiency. Hereinafter, an example of the operation of the vector processor 100 will be described with reference to the drawings.

Figure 3A:
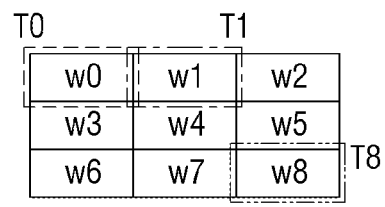
FIG. 3A is a view to describe an operation in a case where a filter is applied according to an embodiment of the disclosure.
Figure 3B:
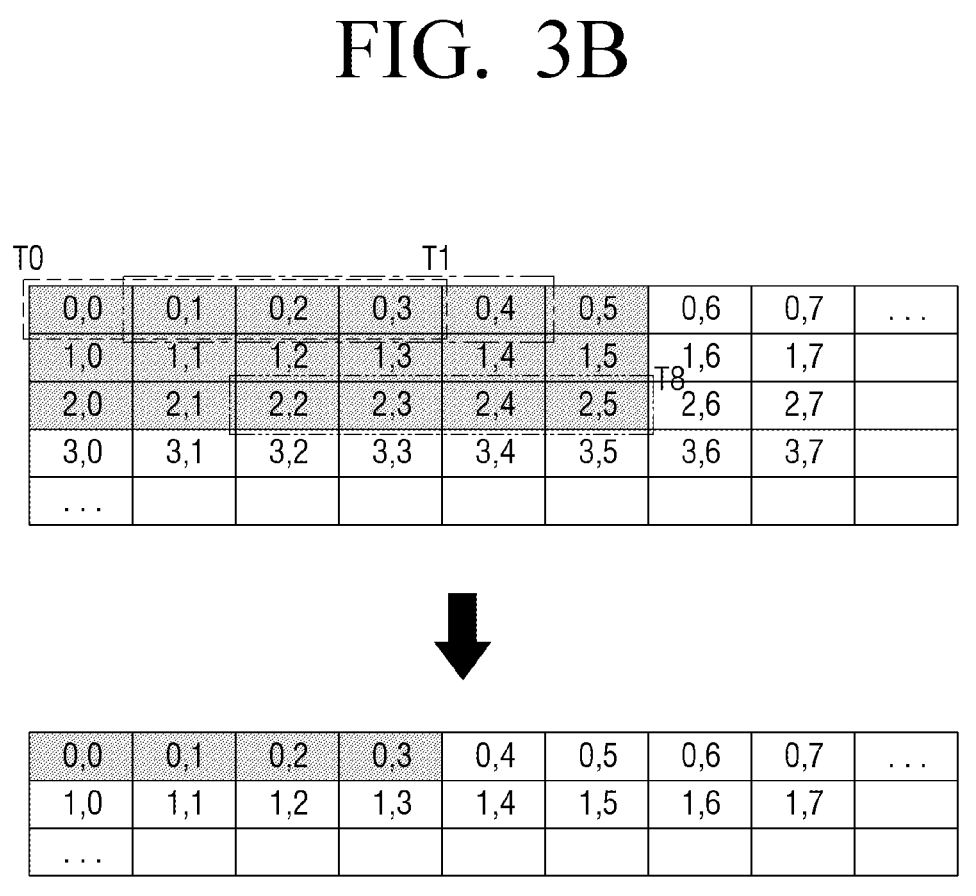

FIGS. 3A to 3C are views to describe an operation in a case where a filter is applied according to an embodiment of the disclosure.

FIG. 3A shows an example of a filter that may be applied to an image. Although FIG. 3A illustrates a 3×3 matrix filter, it is not limited thereto and the filter may have any other type. Further, the art of the disclosure may be applied to all the cases in which a parallel operation may be applied even if it is not a filter.

The vector processor 100 may apply a filter to the image as shown in FIG. 3B. In FIG. 3B, an upper image shows data for each pixel of an image, and a lower image shows an image to which a filter is applied. The filter may be stored in a scalar register file.

For convenience of description, a case where a filter is applied without parallel operation will be described first. When the filter of FIG. 3A is applied to the upper image of FIG. 3B, the processor may determine data of (0, 0) pixel of the lower image of FIG. 3B by multiplying each of w0, w1, . . . , w8 by (0,0), (0,1), (0,2), (1,0), (1,1), (1,2), (2,0), (2,1) and (2,2) pixels of the upper image, and adding all the multiplied values.

The processor may determine the data of (0,1) pixel of the lower image of FIG. 3B by applying each of w0, w1, . . . , w8 to (0,1), (0,2), (0,3), (1,1), (1,2), (1,3), (2,1), (2,2), and (2,3) pixels of the upper image of FIG. 3B. The processor may repeat this process for all pixels and generate the lower image of FIG. 3B.

When performing a parallel operation, the vector processor 100 multiplies w0 by each of (0, 0), (0, 1), (0, 2), and (0, 3) in the upper image. Specifically, multiplication operations of w0 by each of (0, 0), (0, 1), (0, 2), and (0, 3) in the upper image in each of the SIMD lanes may be performed. For example, a multiplication operation of w0 by (0, 0) of the upper image may be performed in the first SIMD lane, a multiplication operation of w0 by (0, 1) of the upper image may be performed in the second SIMD lane, a multiplication operation of w0 by (0, 2) of the upper image may be performed in the third SIMD lane, and a multiplication operation of w0 by (0, 3) of the upper image may be performed in the fourth SIMD lane. The above operations may be performed in the cycle of T0.

Thereafter, a multiplication operation of w1 by (0, 1) of the upper image may be performed in the first SIMD lane, and the multiplication result may be added to the multiplication result of w0 by (0, 0) of the upper image. The same operation may be performed in the remaining SIMD lanes. The above operation may be performed in the cycle of T1. In FIGS. 3A and 3B, data necessary for the T0, T1 and T8 cycles are separately displayed.

That is, the vector processor 100 may perform parallel operation by performing repeated multiplication and addition operations for each SIMD lane. In FIG. 3C, operations for each cycle are indicated by SIMD lanes, and the operation of each configuration in the vector processor 100 will be described in detail with reference to the following drawings.

Figure 4A:
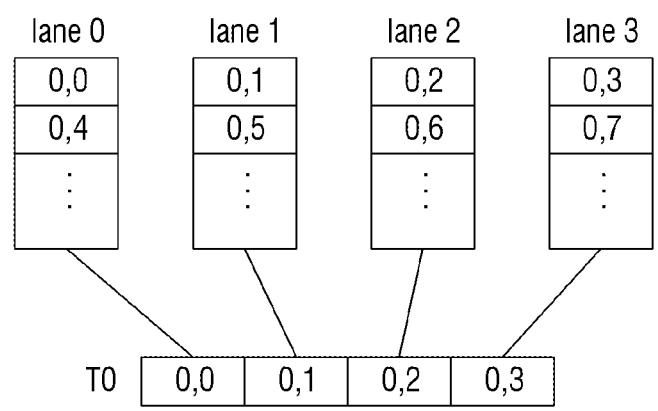
FIG. 4A is a view to describe n operation of a plurality of register files according to an embodiment of the disclosure.
Figure 4B:
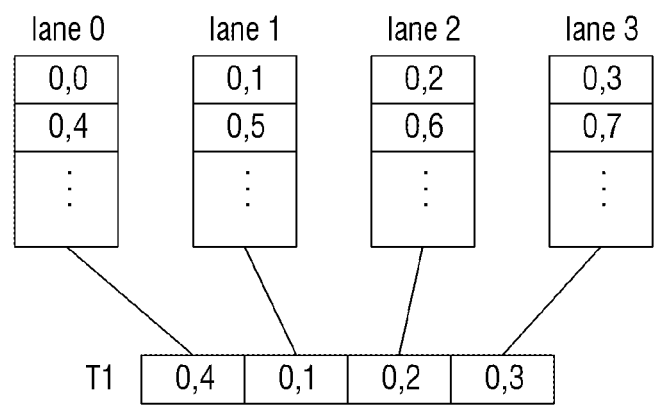
FIG. 4B is a view to describe n operation of a plurality of register files according to an embodiment of the disclosure.

FIGS. 4A and 4B are views to describe n operation of a plurality of register files 110 according to an embodiment of the disclosure.

As shown in FIG. 4A, each of the plurality of register files 110 may store a plurality of data. Here, the plurality of data may be the upper image of FIG. 3B. The $0^{th}$ register file (lane 0) may store (0,0) and (0,4), the first register file (lane 1) may store (0,1) and (0,5), the second register file (lane 2) may store (0,2) and (0,6), and the third register file (lane 3) may store (0,3) and (0, 7).

In the T0 cycle, the 0th register file may output (0, 0) as input data, the first register file may output (0, 1) as input data, the second register file may output (0, 2) as the input data, and the third register file may output (0, 3) as the input data.

The plurality of register files 110 may determine the input data to be output by the reference register address provided by the shuffle control unit 140. That is, the shuffle control unit 140 may provide a reference register address to each of a plurality of register files 110 for each cycle. For example, the shuffle control unit 140 may provide the reference register address R0 to the 0th register file in the T0 cycle, provide the reference register address R0 to the first register file, provide the reference register address R0 to the second register file, and provide the reference register address R0 to the third register file.

Then, as shown in FIG. 4B, in the T1 cycle, the 0th register file may output (0, 4) as input data, the first register file may output (0, 1) as input data, the second register file may output (0, 2) as input data, and the third register file may output (0, 3) as input data.

At this time, the shuffle control unit 140 may provide the reference register address R1 to the 0th register file in the T1 cycle, the reference register address R0 to the first register file, the reference register address R0 to the second register file, and the reference register address R0 to the third register file.

FIGS. 4A and 4B illustrate that four parallel operations may be available as there are four SIMD lanes for convenience of description, but any other number of SIMD lane may be provided.

In FIGS. 4A and 4B, it is described that data of (0, 0) to (0, 7) are stored in the plurality of register files 110, but it is not limited thereto. For example, the plurality of register files 110 may store more data.

When the plurality of register files 110 store data of (0, 0) to (0, 7), each of the reference register addresses may be composed of one bit. However, when the plurality of register files 110 store more data, each of the reference register addresses may be composed of more bits. That is, the number of bits of the reference register address may be determined by the size of the data stored in the plurality of register files.

Alternatively, if the number of bits of the reference register address is predetermined, data stored in the plurality of register files 110 may be determined based on the number of bits of the reference register as well.

Figure 5A:
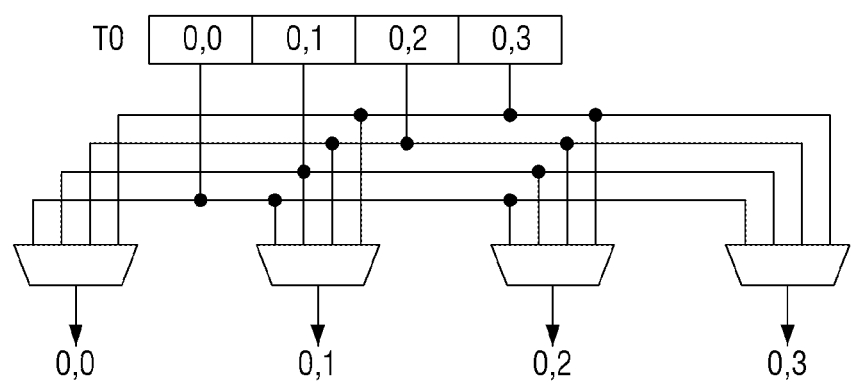
FIG. 5A is a view to describe an operation of a shuffle unit according to an embodiment of the disclosure.
Figure 5B:
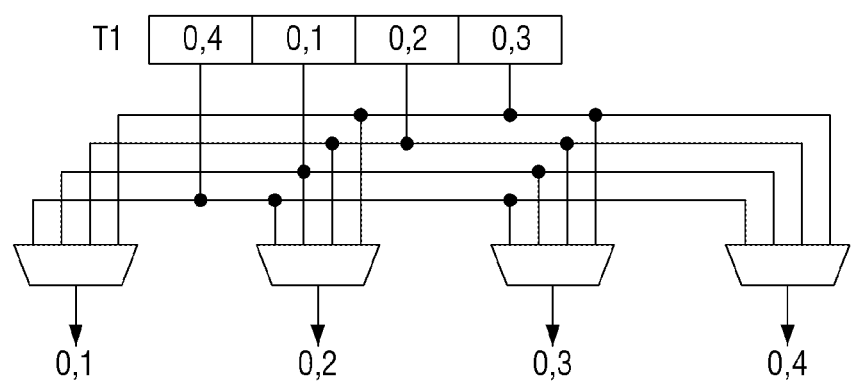
FIG. 5B is a view to describe an operation of a shuffle unit according to an embodiment of the disclosure.

FIGS. 5A and 5Bs are views to describe an operation of a shuffle unit 120 according to an embodiment of the disclosure.

As illustrated in FIG. 5A, the leftmost multiplexer may receive an input of the input data (0, 0), (0, 1), (0, 2), and (0, 3) outputted from the plurality of register files 110 in the T0 cycle. The leftmost multiplexer may output (0, 0) as the input data. The remaining multiplexers may be operating in the similar manner.

At this time, the shuffle control unit 140 may provide information on data that each multiplexer has to output in each cycle. For example, the shuffle control unit 140 may control the leftmost multiplexer to output the input data input through the first input port of the leftmost multiplexer in the T0 cycle.

Then, as illustrated in FIG. 5B, the leftmost multiplexer may receive the input data (0, 0), (0, 1), (0, 2), and (0, 3) outputted from the plurality of register files 110 in the T1 cycle. The leftmost multiplexer may output (0, 1) as input data. The remaining multiplexers may be operating in the similar manner.

At this time, the shuffle control unit 140 may control the leftmost multiplexer to output the input data input through the second input port of the leftmost multiplexer in the T1 cycle.

That is, the shuffle unit 120 may be implemented with a plurality of multiplexers, and each multiplexer may receive a plurality of input data and output one of the input data. Through the above operation, the SIMD lane in which each of the plurality of input data is to be operated may be changed.

The shuffle unit 120 may receive and perform shuffling of a plurality of input data, and then provide the data to the execution unit 130 immediately. Accordingly, the power consumption for storing the shuffled data in the register file 110 again may be reduced, and the operation speed may be improved. In addition, the size of the hardware may be reduced as well.

Figure 6:
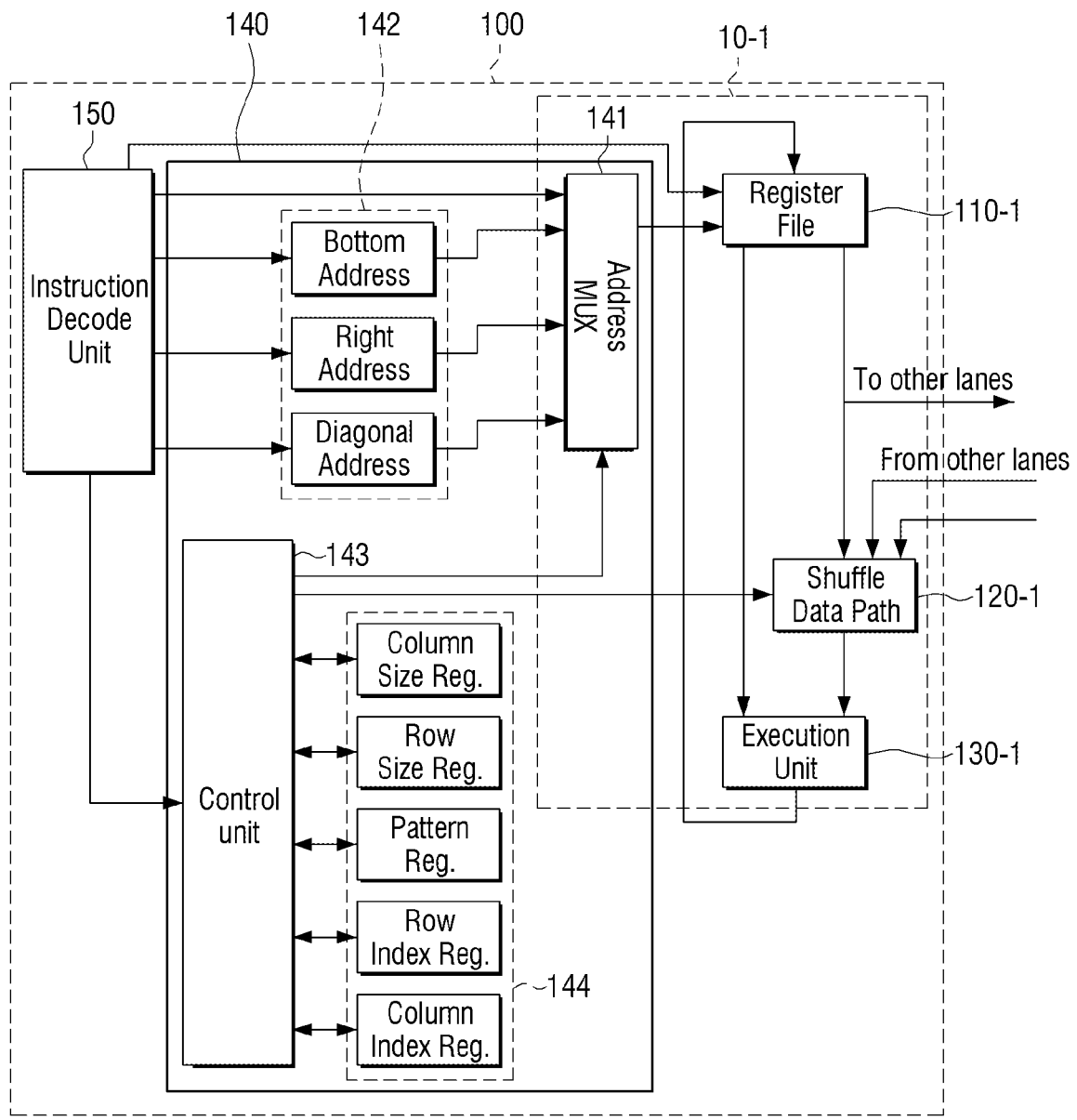
FIG. 6 is a view to describe a two-dimensional (2D) operation according to another embodiment of the disclosure.

FIG. 6 is a view to describe a two-dimensional (2D) operation according to another embodiment of the disclosure. For example, if pixel data of (0, 0), (0, 1), (0, 2), and (0, 3) are operated during the T0 cycle in the upper image of FIG. 3B, when 2D operation is performed, the pixel data of (0, 0), (0, 1), (1, 0), and (1, 1) may be operated during the T0 cycle. The 2D calculation is a well-known art and is very similar to the description of FIG. 3B and will not be further described.

As shown in FIG. 6, at least one address register 142 may include a bottom address, a right address, and a diagonal address. For example, the instruction decode unit may provide a reference register address R0 for referring to pixel data of (0, 0), (0, 1), (1, 0), and (1, 1) to the address multiplexer 141. The at least one address register 142 may provide bottom address R1 for referring to the pixel data of (2, 0), (2, 1), (2, 2), and (2, 3) right address R2 for referring to the pixel data of (0, 2), (0, 3), (1, 2), and (1, 3) and diagonal address R3 for referring to the pixel data of (2, 2), (2, 3), (3, 2), and (3, 3) to the address multiplexer 141.

Meanwhile, the configuration register 144 may store the input data according to the instructions as shown below.

[Instruction 1]

sf_set2d $bottom, $right, $diagonal, num_row, num_col, row_stride, col_stride

Here, $bottom, $right, and $diagonal may be bottom address, right address, and diagonal address, respectively. The num_row, and num_col may be the maximum value in the vertical direction and the maximum value in the horizontal direction, respectively. The row_stride and col_stride may be a vertical increment or a horizontal increment, respectively. That is, the configuration register 144 may receive the maximum value in the vertical direction, the maximum value in the horizontal direction, the vertical increment, and the horizontal increment as column size reg., row size reg., row index reg., and column index reg., respectively. The pattern reg. may be input as the instruction itself and represents a reference pattern.

Here, the reference pattern represents a data access order. For example, the reference pattern may be one of 1D increase, 2D increase, and 2D zigzag.

The control unit 143 may receive an input of the above data and control the address multiplexer 141 and the shuffle data path 120-1.

Besides, a state update instruction after the multiplication operation or multiply and add (MAC) operation may be used, as shown below.

[Instruction 2]

sf_mul $res, $multiplicand, $multiplier sf_mac $acc, $multiplicand, $multiplier

In instruction 2, multiplicand may be an image, and multiplier may be a filter. Here, res may be the multiplication result of multiplicand and multiplier, and acc may be the result of adding the result of multiplying multiplicand and multiplier to the previous value.

As described above, when instruction 1 and instruction 2 are used, simplification of a program code is possible.

FIG. 7 is a view to describe simplification of a program code according to an embodiment of the disclosure.

The left side of FIG. 7 illustrates a program code according to the related art and the right side of FIG. 7 illustrates a program code according to this disclosure.

According to the related art, data stored in a vector register file is shuffled and then stored as a vector register file again. Accordingly, the program code according to the related art may include instructions for shuffling, such as hcat and vcat. Also, data shuffling is required for every cycle, and accordingly, hcat or vcat may be necessary for every cycle.

According to this disclosure, after the data stored in the plurality of register files 110 is shuffled, operations may be performed immediately without storing the data in the plurality of register files 110. That is, there is no need for shuffling instructions such as hcat and vcat, and only the sf_set2d instruction described above is necessary. That is, the initial input of the instruction sf_set2d is stored as the shuffling method, and the plurality of register files 110 may perform shuffling for data necessary for each cycle and provide the data.

According to the disclosure, parallel operation may be performed using sf_mul or sf_mac described above, without using hcat or vcat for each cycle.

Figure 8:
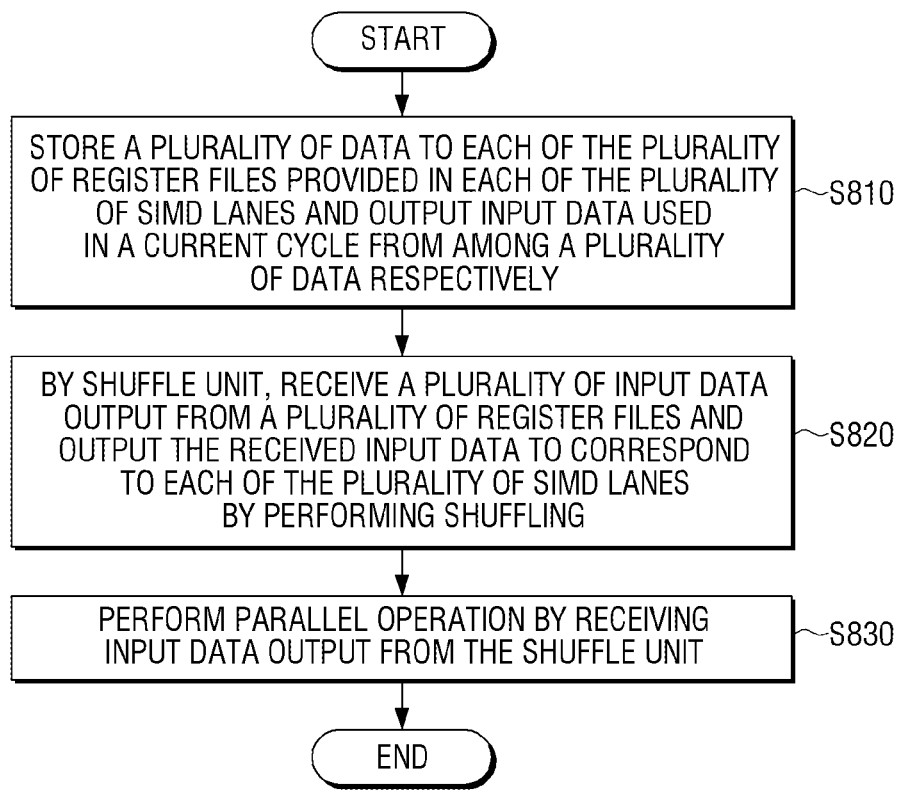
FIG. 8 is a flowchart to describe a control method of a vector processor according to an embodiment of the disclosure.

FIG. 8 is a flowchart to describe a control method of a vector processor according to an embodiment of the disclosure.

First, a plurality of data are stored in each of a plurality of register files provided in each of a plurality of SIMD lanes, and input data used for the current cycle among a plurality of data is output in step S810. By the shuffle unit, a plurality of input data outputted from the plurality of register files may be received, and the received plurality of input data may be shuffled and output to correspond to each of the plurality of SIMD lanes in step S820. Then, the input data outputted from the shuffle unit may be received and a parallel operation may be performed in step S830.

Here, the step of shuffling and outputting in step S820 may include receiving a plurality of input data outputted from the plurality of register files by each of a plurality of multiplexers provided in each of the plurality of SIMD lanes in the shuffle unit, and outputting one input data corresponding to the lane in which the corresponding multiplexer is provided among the plurality of received input data.

The method may further include controlling a plurality of register files and a shuffle unit for each cycle based on an input instruction. At this time, the plurality of register files and the shuffle unit may be controlled for a specific cycle, and then the current state may be stored. That is, when one cycle is ended, the stored current state may be updated.

Here, the step of controlling may include transmitting the reference register address of each of the plurality of SIMD lanes to each of the plurality of register files, and the reference register address may be an address of input data which is used for the current cycle among the plurality of data stored in each register file.

In addition, the step of controlling may include transmitting the shuffle information for the plurality of input data to the shuffle unit, and the shuffle information may be information on the input data to be output in each of the plurality of SIMD lanes.

The step of controlling may include controlling the address multiplexer to provide the reference register address for the input data to be used in the current cycle to each of the plurality of register files.

Here, the step of controlling may include storing the reference register address of each of the plurality of SIMD lanes to at least one address register and controlling the address multiplexer to provide one of the plurality of reference register addresses provided from the instruction decode unit and at least one address registers to a corresponding register file.

The input instruction may include at least one of a type of operation to be processed by the execution unit, an operation method, and information on the horizontal and vertical increments.

The step of performing parallel operation in step S830 may include performing parallel operation of input data outputted from the shuffle unit using the scalar data outputted from the scalar register file.

According to various embodiments of the disclosure as described above, the vector processor may perform shuffling of the input data and then perform operation without restoring, thereby improving processing speed and energy efficiency.

Meanwhile, the methods according to various embodiments may be programmed and stored in various storage media. Accordingly, the methods according to various embodiments described above may be implemented in various types of electronic apparatuses that execute the storage medium.

Specifically, a non-transitory computer readable medium storing a program sequentially executing the control method may be provided.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a Solid State Drive (SSD), a blu-ray disc, a universal serial bus (USB), a memory card, a read only memory (ROM), and the like, and may be provided.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

The invention claimed is:

1. A vector processor comprising:
   a plurality of register files, wherein each of the plurality of register files is provided to a corresponding lane of a plurality of single instruction multiple data (SIMD) lanes, stores a plurality of data, and outputs input data to be used in a current cycle among the plurality of data;
   a shuffle unit for receiving a plurality of input data outputted from the plurality of register files, performing shuffling of the received plurality of input data such that the received plurality of input data respectively correspond to the plurality of SIMD lanes, and outputting the shuffled plurality of input data, wherein a number of the shuffled plurality of input data outputted by the shuffle unit is the same as a number of the plurality of input data received by the shuffle unit;
   an execution unit for receiving the shuffled plurality of input data outputted from the shuffle unit and performing a parallel operation on the shuffled plurality of input data; and
   a shuffle control unit for controlling the plurality of register files and the shuffle unit based on an input instruction,
   wherein the shuffle unit comprises a plurality of multiplexers configured to receive the plurality of input data outputted from the plurality of register files and output the shuffled plurality of input data, the plurality of input data received by the plurality of multiplexers respectively correspond to the plurality of register files, and each of the plurality of multiplexers is connected to at least one register file from among the plurality of register files and configured to receive input data from one of the at least one connected register file, wherein the shuffle control unit comprises an address multiplexer configured to provide a reference register address to each of the plurality of register files, and the shuffle control unit controls the plurality of register files to output the plurality of input data based on the reference register address, wherein the shuffle control unit includes a register for storing a current state, generates shuffle information on the plurality of input data based on at least one of the input instruction and the current state, transmits the shuffle information to the shuffle unit, and updates the current state after the current cycle, wherein the shuffle information is information on input data to be outputted from each of the plurality of SIMD lanes, and wherein the shuffle control unit controls the plurality of multiplexers to output different data each other.

2. The vector processor of claim 1, wherein each of the plurality of multiplexers is connected to the plurality of register files, receives the plurality of input data outputted from the plurality of register files and outputs one input data corresponding to a lane of the plurality of SIMD lanes provided with a corresponding multiplexer of the plurality of multiplexers among the received plurality of input data.

3. The vector processor of claim 1, wherein the reference register address is an address of input data which is used in the current cycle among the plurality of data.

4. The vector processor of claim 1, wherein the shuffle control unit further comprises:
a control unit to control the address multiplexer.

5. The vector processor of claim 4, wherein the shuffle control unit further comprises:
at least one address register to store a reference register address of each of the plurality of SIMD lanes, and
wherein the control unit controls the address multiplexer to provide one of a plurality of reference register addresses provided from an instruction decode unit and the at least one address register to a corresponding register file.

6. The vector processor of claim 1, wherein the input instruction comprises at least one of a type of operations to be processed by the execution unit, an operation method, and information on an increment in a horizontal direction and an increment in a vertical direction.

7. The vector processor of claim 1, further comprising:
a scalar register file,
wherein the execution unit performs the parallel operation of the shuffled plurality of input data outputted from the shuffle unit using scalar data outputted from the scalar register file.

8. A control method of a vector processor, the control method comprising:
storing a plurality of data to each of a plurality of register files that is provided to a corresponding lane of a plurality of single instruction multiple data (SIMD) lanes, and outputting input data to be used in a current cycle among the plurality of data;
receiving, by a shuffle unit, a plurality of input data outputted from the plurality of register files, performing, by the shuffle unit, shuffling of the received plurality of input data such that the received plurality of input data respectively correspond to the plurality of SIMD lanes, and outputting, by the shuffle unit, the shuffled plurality of input data, wherein a number of the shuffled plurality of input data outputted from the shuffle unit is the same as a number of the plurality of input data received by the shuffle unit;

receiving the shuffled plurality of input data outputted from the shuffle unit and performing a parallel operation on the shuffled plurality of input data; and controlling, by a shuffle control unit, the plurality of register files and the shuffle unit based on an input instruction, wherein the shuffle unit comprises a plurality of multiplexers configured to receive the plurality of input data outputted from the plurality of register files and output the shuffled plurality of input data, the plurality of input data received by the plurality of multiplexers respectively correspond to the plurality of register files, each of the plurality of multiplexers is connected to at least one register file from among the plurality of register files and configured to receive input data from one of the at least one connected register file, and the shuffle control unit comprises an address multiplexer, wherein the controlling of the plurality of register files and the shuffle unit comprises:

controlling the address multiplexer to provide a reference register address to each of the plurality of register files, and controlling the plurality of register files to output the plurality of input data based on the reference register address, wherein the shuffle control unit includes a register for storing a current state, wherein the controlling of the plurality of register files and the shuffle unit comprises generating shuffle information on the plurality of input data based on at least one of the input instruction and the current state, transmitting the shuffle information to the shuffle unit, and updating the current state after the current cycle, wherein the shuffle information is information on input data to be outputted from each of the plurality of SIMD lanes, and wherein the shuffle control unit controls the plurality of multiplexers to output different data each other.

9. The control method of claim 8, wherein the receiving of the plurality of input data comprises receiving the plurality of input data outputted from the plurality of register files by each of the plurality of multiplexers provided in the plurality of SIMD lanes in the shuffle unit, and the outputting of the shuffled plurality of input data comprises outputting one input data corresponding to a lane of the plurality of SIMD lanes provided with a corresponding multiplexer of the plurality of multiplexers among the received plurality of input data, each of the plurality of multiplexers being connected to the plurality of register files.

10. The control method of claim 8, wherein the reference register address is an address of input data which is used in the current cycle among the plurality of data.

11. The control method of claim 8, wherein the controlling of the address multiplexer comprises controlling at least one address register to store a reference register address of each of the plurality of SIMD lanes and controlling the address multiplexer to provide one of a plurality of reference register addresses provided from an instruction decode unit and the at least one address register to a corresponding register file.

12. The control method of claim 8, wherein the input instruction comprises at least one of a type of operations to be processed by an execution unit, an operation method, and information on an increment in a horizontal direction and an increment in a vertical direction.

13. The control method of claim 8, further comprising performing the parallel operation of the shuffled plurality of input data outputted from the shuffle unit using scalar data outputted from a scalar register file.

* * * * *